US008412712B2

(12) United States Patent
Caceres

(10) Patent No.: US 8,412,712 B2
(45) Date of Patent: Apr. 2, 2013

(54) GROUPING METHODS FOR BEST-VALUE DETERMINATION FROM VALUES FOR AN ATTRIBUTE TYPE OF SPECIFIC ENTITY

(75) Inventor: Barry M. Caceres, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/341,682

(22) Filed: Dec. 22, 2008

(65) Prior Publication Data

US 2010/0161603 A1 Jun. 24, 2010

(51) Int. Cl.
*G06F 7/00* (2006.01)
*G06F 17/30* (2006.01)
(52) U.S. Cl. .......................... 707/740; 706/20
(58) Field of Classification Search ................. None
See application file for complete search history.

(56) References Cited

U.S. PATENT DOCUMENTS

| 5,956,707 A * | 9/1999 | Chu ............................... 707/759 |
| 2004/0210763 A1* | 10/2004 | Jonas ........................... 713/193 |
| 2008/0004864 A1* | 1/2008 | Gabrilovich et al. ............. 704/9 |

OTHER PUBLICATIONS

O. Benjelloun, H. Garcia-Molina, D. Memestrina, Q. Steven, E. Whang and J. Widom, "Swoosh: A Generic Approach to Entity Resolution" The VIDB Journal Manuscript No. (20 pgs).
B. On, E. Elmacioglu, D. Lee, J. Kang, J. Pei, "Improving Grouped-Entity Resolutions using Quasi-Cliques".
D. Menestrain, O. Benjelloun, and H. Carcis-Molina, "Generic Entity Resolution with Data Confidences" Stanford University (8 pgs).
I. Bhattachyarya and L. Getoor, "A Latent Dirichlet Model for Unsupervised Entity Resolution" University of Maryland, Department of Computer Science, pp. 47-58.
Barry M. Caceres, U.S. Patent Application entitled, "Grouping Similar Values for a Specific Attribute Type of an Entity to Determine Relevance and Best Values,".
Office Action of U.S. Appl. No. 12/341,643 dated Apr. 13, 2011.
Indrajit Bhattacharya et al., "Collective Entity Resolution in Relational Data," ACM Transactions on Knowledge Discovery from Data, Mar. 2007, vol. 1(1): pp. 1-36.

* cited by examiner

*Primary Examiner* — Usmaan Saeed
*Assistant Examiner* — Michele Choi
(74) *Attorney, Agent, or Firm* — Patterson & Sheridan, LLP

(57) ABSTRACT

A method is provided of grouping similar values of an attribute type and determining the best value of an attribute type for an entity in an entity resolution system. By applying attribute grouping rules to organize similar values into groups, an accurate number of "distinct" values for an entity is ascertained by counting the number of resulting groups. A preferred group is selected from the resulting groups and a "best value" is selected from the preferred group by applying best value rules.

14 Claims, 16 Drawing Sheets

Attribute Grouping Rule Configuration — 910

| | |
|---|---|
| Rule Name: | Entity has too many aliases. — 920 |
| Processing Rank: | 50 — 930 |
| Attribute Type: | Full Name — 940 |
| Detection Method: | Optimistic Threshold Grouping — 950 |
| Ditinct Value Threshold: | 3 — 960 |
| Grouping Score Threshold: | 85 — 970 |
| Minimum Average Score: | 80 — 975 |
| Minimum Pair-Wise Score: | 70 — 980 |
| If Satisfied, Then: | Skip all subsequent rules for same attribute type — 985 |

[ Save ] [ Revert ]

Attribute Grouping Rule Configuration — 1010

| | |
|---|---|
| Rule Name: | Entity has too many aliases. — 1020 |
| Processing Rank: | 50 — 1030 |
| Attribute Type: | Full Name — 1040 |
| Detection Method: | Optimistic Threshold Grouping — 1050 |
| Comparison Method: | Name Comparator ( Version 1 ) — 1060 |
| Ditinct Value Threshold: | 3 — 1070 |
| Grouping Score Threshold: | Close — 1075 |
| Minimum Pair-Wise Score: | Different — 1080 |
| If Satisfied, Then: | Skip all subsequent rules for same attribute type — 1085 |

[ Save ] [ Revert ]

Attribute Grouping Rule Configuration — 1110

| | | |
|---|---|---|
| Rule Name: | Entity has too many aliases. | — 1120 |
| Processing Rank: | 50 | — 1130 |
| Attribute Type: | Full Name ⌄ | — 1140 |
| Detection Method: | Pessimistic Threshold Grouping ⌄ | — 1150 |
| Ditinct Value Threshold: | 3 | — 1160 |
| Grouping Score Threshold: | 85 | — 1170 |
| If Satisfied, Then: | Skip all subsequent rules for same attribute type ⌄ | — 1180 |

[ Save ] [ Revert ]

Best Value Rule Configuration — 1510

| | |
|---|---|
| Rule Name: | Determine the Best Full Name — 1520 |
| Processing Rank: | 50 — 1530 |
| Attribute Type: | Full Name — 1540 |
| Detection Method: | Optimistic Threshold Grouping — 1550 |
| Grouping Score Threshold: | 85 — 1555 |
| Minimum Average Score: | 80 — 1560 |
| Minimum Pair-Wise Score: | 70 — 1565 |
| Base Confidence Level: | 80 — 1570 |

Only Appliy to Entities Satisfying:

| Attribute Type | Matching Value |
|---|---|
| Gender | Female — 1580 |

*Add Qualifying Criteia*

[ Save ] [ Revert ]

Best Value Rule Configuration — 1610

Rule Name: [Determine the Best Full Name] — 1620
Processing Rank: [50] — 1630
Attribute Type: [Full Name ▼] — 1640
Detection Method: [Optimistic Threshold Grouping ▼] — 1650
Comparison Method: [Name Comparator (Version 1) ▼] — 1655
Grouping Score Threshold: [Close ▼] — 1660
Minimum Pair-Wise Score: [Different ▼] — 1665
Base Confidence Level: [80] — 1670

Only Appliy to Entities Satisfying:

| Attribute Type | Matching Value |
|---|---|
| [Gender ▼] | [Male ▼] — 1685 |

Add Qualifying Criteia

[Save] [Revert]

Best Value Rule Configuration

| | |
|---:|:---|
| Rule Name: | Determine the Best Names — 1720 |
| Processing Rank: | 60 — 1730 |
| Attribute Types: | Names (Full Name, Given Name, Surname) ⌄ — 1740 |
| Detection Method: | Pessimistic Threshold Grouping ⌄ — 1750 |
| Grouping Score Threshold: | 85 — 1755 |
| Base Confidence Level: | 70 — 1760 |

Only Appliy to Entities Satisfying:

| Attribute Type | Matching Value |
|---|---|
| Gender ⌄ | Female ⌄ — 1770 |

*Add Qualifying Criteia*

[ Save ] [ Revert ]

GROUPING METHODS FOR BEST-VALUE DETERMINATION FROM VALUES FOR AN ATTRIBUTE TYPE OF SPECIFIC ENTITY

CROSS REFERENCE TO RELATED APPLICATIONS

This application relates to commonly assigned, co-pending U.S. patent application Ser. No. 12/341,643 filed Dec. 22, 2008, entitled, "Grouping Similar Values for a Specific Attribute Type of an Entity to Determine Relevance and Best Values" U.S. Patent Application Publication No. 2010/0161602), which is incorporated herein by reference in its entirety.

BACKGROUND OF THE INVENTION

1. Field of the Invention

Embodiments of the invention generally relate to processing identity records in an entity resolution system, and more particularly, to grouping similar values of an entity attribute type and determining the best value of an entity attribute type in an entity resolution system.

2. Description of the Related Art

In an entity resolution system, identity records are loaded and resolved against known identities to derive a network of entities and relationships between entities. An "entity" generally refers to an organizational unit used to store identity records that are resolved at a "zero-degree relationship." That is, each identity record associated with a given entity is believed to describe the same person, place, or thing (e.g., the identity of a employee represented as an employee record from an employee database entity-resolved with the identity of a property owner from the county assessor's public records). Thus, one entity may reference multiple individual identities with potentially different values for various attributes. This is frequently benign, e.g., in a case where an entity includes two identities with different names, a first being an identity record identifying a woman based on a familial surname and a second identity record identifying the same woman based on a married surname. Of course, in other cases, differing attribute values between identities in the same entity may be an indication of mischief or a problem, e.g., in a case where one individual is impersonating another, using a fictitious identify, or engaging in some form of identify theft. The entity resolution system may link entities to one another by relationships. For example, a first entity may have a first degree relationship with a second entity based on identity records (in one entity, the other, or both) that indicate the individuals represented by these two entities are married to one another, reside at the same address, or share some other common information.

One task performed by an entity resolution system is to generate alerts when the existence of a particular identity record (typically the inbound record being processed) causes some condition to be satisfied that is relevant in some way and that may require additional scrutiny by an analyst. For example, the entity resolution system may generate a list of alerts about identities or entities that should be examined by an analyst. Relevance detection may be used to identify potential threats and fraud as well as potential opportunity. For example, if a person has more than three distinct first names or more than one social security number, then a fraud alert may be generated.

In entity resolution systems, a single entity may have multiple attribute values for the same attribute type. Frequently, this may result from multiple records being provided that include a value for a given attribute. For example, an entity may have multiple addresses, phone numbers, driver's license numbers, names, etc. In some cases, different values for an attribute may be appropriate (e.g., when a person changes telephone numbers or moves from one place to another). Multiple attribute values may also exist due to the variety of systems from which identity records are drawn. Moreover, different record systems may introduce typos, transpose characters, or make system-specific alterations, such as truncating an address.

SUMMARY OF THE INVENTION

One embodiment of the invention includes a method of selecting a representative value for a specified attribute type in an entity resolution system storing identity records related to a plurality of entities. The method may generally include receiving a selection of an entity in the entity resolution system. The selected entity is associated with a plurality of identity records stored by the entity resolution system, and each identity record includes one or more attribute types and corresponding attribute values. Typically, the identity records have an assumed relation to a distinct individual. The method may also include generating one or more distinct value groups. Each distinct value group includes a set of one or more attribute values corresponding to the specified attribute type. The method may also include selecting one of the distinct value groups as a preferred group, and selecting, from the preferred group, a first attribute value. The first attribute value is used to represent the specified attribute type for the selected entity.

Another embodiment of the invention includes a computer program product for selecting a representative value for a specified attribute type in an entity resolution system storing identity records related to a plurality of entities. The computer program product may generally include a computer usable medium having computer usable program code embodied therewith. The computer usable program code may generally be configured to receive a selection of an entity in the entity resolution system. The selected entity is associated with a plurality of identity records stored by the entity resolution system, and each identity record includes one or more attribute types and corresponding attribute values. Typically, the identity records have an assumed relation to a distinct individual. The program code may be further configured to generate one or more distinct value groups. Each distinct value group includes a set of one or more attribute values corresponding to the specified attribute type. The program code may be further configured to select one of the distinct value groups as a preferred group and select, from the preferred group, a first attribute value. The first attribute value is used to represent the specified attribute type for the selected entity.

Still another embodiment of the invention includes a system having a processor and a memory containing a program, which, when executed by the processor, is configured to select a representative value for a specified attribute type in an entity resolution system storing identity records related to a plurality of entities by performing an operation. The operation may generally include receiving a selection of an entity in the entity resolution system. The selected entity is associated with a plurality of identity records stored by the entity resolution system, and each identity record includes one or more attribute types and corresponding attribute values. Typically, the identity records have an assumed relation to a distinct individual. The operation may further include generating one or more distinct value groups. Each distinct value group includes a set of one or more attribute values corresponding to the specified attribute type. The operation may further include selecting one of the distinct value groups as a preferred group and selecting, from the preferred group, a first attribute value. The first attribute value is used to represent the specified attribute type for the selected entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 9 illustrates an example of graphical user interface components used to configure optimistic threshold grouping in an entity resolution system, according to one embodiment of the invention.

FIG. 10 illustrates another example of graphical user interface components used to configure optimistic threshold grouping in an entity resolution system, according to one embodiment of the invention.

FIG. 11 illustrates an example of graphical user interface components used to configure pessimistic threshold grouping in an entity resolution system, according to one embodiment of the invention.

FIG. 15 illustrates an example of graphical user interface components used to configure a best value determination rule in an entity resolution system, according to one embodiment of the invention.

FIG. 16 illustrates another example of graphical user interface components used to configure a best value determination rule in an entity resolution system, according to one embodiment of the invention.

FIG. 17 illustrates another example of graphical user interface components used to configure a best value determination rule in an entity resolution system, according to one embodiment of the invention.

DETAILED DESCRIPTION OF THE PREFERRED EMBODIMENTS

Figure 1:
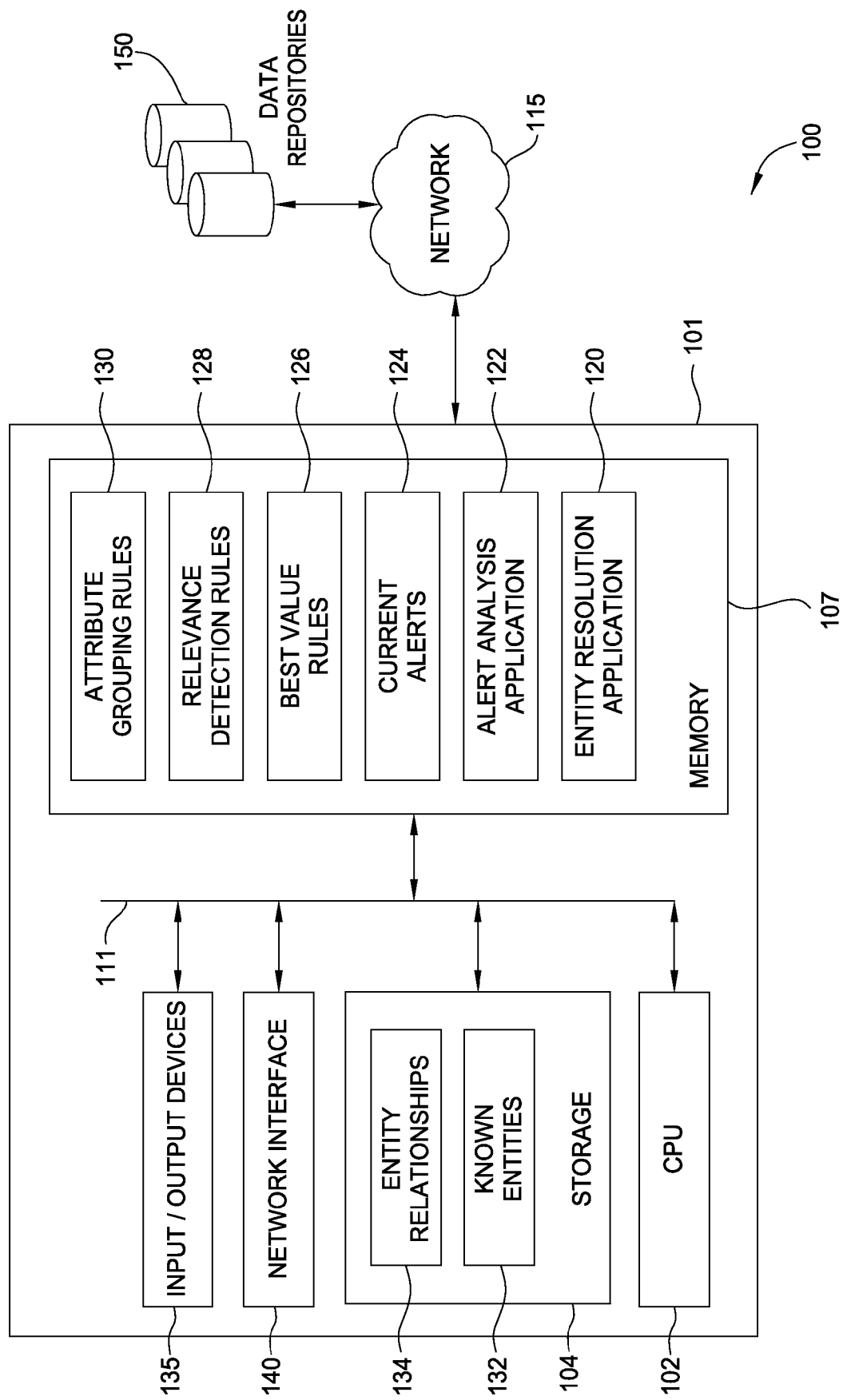
FIG. 1 is a block diagram illustrating a computing environment that includes an entity resolution application, attribute grouping rules, and best value rules, according to one embodiment of the invention.

Embodiments of the invention provide a method of grouping similar values of an attribute type and determining, from the grouped values, a "best" value of that attribute type for an entity in an entity resolution system. The "best" value is generally the value selected by the entity resolution system as being most representative of a given entity. An entity resolution system may resolve identity records into entities using an entity resolution process. A common occurrence within such a system is to have a single entity with multiple values for the same attribute type. For example, an entity may have multiple names, addresses, phone numbers, social security numbers, driver's license numbers, passport numbers, etc. In some cases, multiple values for an attribute may accumulate over time or due to the particular attribute type (e.g., a home phone number versus mobile phone number). In other cases, multiple values may be found due to the disparate systems from which the identity records are drawn or introduced due to typos, characters being transposed, or system aspects (such as limiting a street name to a short number of characters so the address appears to be different when the street name is truncated). For example, assume that the records for a given individual in an entity resolution system include the following phone numbers:

702.555.1212
702-555-1212
(702) 555-1212
702.555.1212
702-555-1313
702-555-1313

In this example, six different phone numbers are listed representing two distinct phone numbers, with other differences based on how the phone numbers are formatted. Similarly, assume that the identity records list the name of the individual associated with these phone numbers as follows:

Robert James Smith
J. Smith
Bob Smith
Robert Smith,
Robert James
James Roberts

Embodiments of the invention include a method of organizing attribute values associated with an entity for a specific attribute type into groups, based on a level of similarity with other members of the group. Two attribute values may be placed in the same group if a quantitative pair-wise comparison score is above a threshold value, referred to as a grouping threshold (GT). For example, a comparison score of 1 may indicate very different values, whereas a score of 10 may indicate an exact match. Using the input records listed above, an entity resolution system may group together "Robert James Smith," "Bob Smith," and "Robert Smith," and leave the remaining three names in separate groups (referred to as "singleton groups"). Since the three grouped names are very similar to one another, the group may represent one "distinct" name. Therefore, the resulting four groups of names may represent four distinct values for the "name" attribute. In one embodiment, if the number of distinct values exceeds a specified threshold (referred to as a distinct value threshold (DVT)), then an indication may be given that the entity is relevant, i.e., the entity resolution system may generate an alert. In the example above, an alert may be generated if the DVT for the "name" attribute is set to "3," because there are more than three distinct values for the "name" attribute.

Similarly, the entity resolution system may create two groups out of the above six phone numbers by using pair-wise comparison scores to group the first four numbers together and the remaining two numbers together. Of course, a variety of scoring methods may be used, such as using ordered tags ("different," "similar," "close," and "exact") or percentages (0% indicating completely different and 100% indicating exact match or vice-versa).

In one embodiment, the entity resolution system may also include a method of selecting a preferred group and choosing a "best" value from the members of the preferred group. As used herein a "preferred" group refers to a group selected from multiple available groups as having values representative of a given entity or individual (as represented in the entity resolution system using multiple identity records). Similarly, a "best" value refers to an attribute from a group selected to represent that group, and in the case of a "best" value for a "preferred" group, the entity itself. A preferred group may be selected, e.g., as the one with the most members. In such a case, a "best" value could be chosen either arbitrarily (since members of the same group are typically similar to one another) or by determining a "mean" attribute value as the value with the least average pair-wise difference with other members of the group.

Further, an entity resolution system may present an entity summary for this individual using the name of "Robert Smith" because it has the least average pair-wise difference with other members of the group ("Robert James Smith," "Bob Smith," and "Robert Smith"). Similarly, the entity resolution system may select for display the phone number "702.555.1212" because it has the least average pair-wise difference with other members of the group ("702.555.1212," "702-555-1212," "(702) 555-1212," and "702.555.1212"). Of course, other methods for choosing the best representative value may be implemented. For example, an entity resolution system may select the phone number "(702) 555-1212" from the above group because its format is more widely used.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable medium may be, for example but not limited to, an electronic, magnetic, optical, electromagnetic, infrared, or semiconductor system, apparatus, device, or propagation medium. More specific examples a computer-readable storage medium include a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Further, computer useable media may also include an electrical connection having one or more wires as well as include optical fibers, and transmission media such as those supporting the Internet or an intranet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable storage medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a block diagram 100 illustrating a computing environment that includes an entity resolution application 120, attribute grouping rules 130, and best value rules 126, according to one embodiment of the invention. A computer system 101 is included to be representative of existing computer systems, e.g., desktop computers, server computers, laptop computers, tablet computers, and the like. However, the computer system 101 illustrated in FIG. 1 is merely an example of a computing system. Embodiments of the present invention may be implemented using other computing systems, regardless of whether the computer systems are complex multi-user computing systems, such as a cluster of individual computers connected by a high-speed network, single-user workstations, or network appliances lacking non-volatile storage. Further, the software applications described herein may be implemented using computer software applications executing on existing computer systems. However, the software applications described herein are not limited to any currently existing computing environment or programming language, and may be adapted to take advantage of new computing systems as they become available.

As shown, computer system 101 includes a central processing unit (CPU) 102, which obtains instructions and data via a bus 111 from memory 107 and storage 104. CPU 102 represents one or more programmable logic devices that perform all the instruction, logic, and mathematical processing in a computer. For example, CPU 102 may represent a single CPU, multiple CPUs, a single CPU having multiple processing cores, and the like. Storage 104 stores application programs and data for use by computer system 101. Storage 104 may be hard-disk drives, flash memory devices, optical media and the like. Computer system 101 may be connected to a data communications network 115 (e.g., a local area network, which itself may be connected to other networks such as the internet). As shown, storage 104 includes a collection of known entities 132 and entity relationships 134. Of course, elements from known entities 132 and entity relationships 134 may be moved into memory 107, as needed. In one embodiment, each known entity 132 stores one or more identity records that are resolved at a "zero-degree relationship." That is, each identity record in a given known entity 132 is believed to describe the same person, place, or thing represented by that known entity 132. Additionally, computer system 101 includes input/output devices 135 such as a mouse, keyboard and monitor, as well as a network interface 140 used to connect computer system 101 to network 115.

Entity relationships 134 represent identified connections between two (or more) entities. In one embodiment, relationships between entities may be derived from identity records associated with a first and second entity, e.g., records for the first and second entity sharing an address or phone number. Relationships between entities may also be inferred based on identity records in the first and second entity, e.g., records indicating a role of "employee" for a first entity and a role of "vendor" for a second entity. Relationships may also be based on express statements of relationship, e.g., where an identity record associated with the first entity directly states a relationship to the second e.g., an identity record listing the name of a spouse, parent, child, or other family relation, as well as other relationships such as the name of a friend or work supervisor.

Memory 107 can be one or a combination of memory devices, including random access memory, nonvolatile or backup memory, (e.g., programmable or flash memories, read-only memories, etc.). As shown, memory 107 includes the entity resolution application 120 and the alert analysis application 122. Memory 107 also includes a set of attribute grouping rules 130, a set of relevance detection rules 128, a set of best value rules 126, and a set of current alerts 124. The rules and alerts are discussed in greater detail below.

In one embodiment, the entity resolution application 120 provides a software application configured to resolve inbound identity records received from a set of data repositories 150 against the known entities 132. When an inbound record is determined to reference one (or more) of the known entities 132, the record is then associated with that entity 132. Additionally, the entity resolution application 120 may be configured to create relationships 134 (or strengthen or weaken existing relationships) between known entities 132, based on an inbound identity record. For example, the entity resolution application 120 may merge two entities where a new inbound entity record includes the same social security number as one of the known entities 132, but with a name and address of another known entity 132. In such a case, the new entity would include multiple names believed to represent the same individual.

Further, the entity resolution application 120 (or the alert analysis application 122) may be configured to present a display of records associated with a given entity. For example, assume an alert is generated based a newly received identity record (e.g., a hotel check-in record that resolves to an entity on a banned list). In one embodiment, the entity resolution application 120 (or the alert analysis application 122) may present an alert summary of the attributes of the entity that resulted in such an alert (i.e., the individual banned from a hotel now believed to be checked-in to that hotel). In such a case, the best value determination rules may be used to select the name of the individual to display. For example, assume that the individual has checked into the hotel using an assumed name, but listed a phone number known to be associated with the banned individual. In such a case the entity resolution system 120 (or the alert analysis application 122)

could display the name of the individual associated with the phone number over the name under which the individual checked in to the hotel.

Illustratively, computing environment 100 also includes the set of data repositories 150. In one embodiment, the data repositories 150 each provide a source of inbound identity records processed by the entity resolution application 120 and the alert analysis application 122. The data repositories 150 may include information from public sources (e.g., telephone directories and/or county assessor records, among others). The data repositories 150 may also include information from private sources, e.g., a list of employees and their roles within an organization, information provided by individuals directly such as forms filled out online or on paper, and records created concomitant with an individual engaging in some transaction (e.g., hotel check-in records or payment card use). Additionally, data repositories 150 may include information purchased from vendors selling data records. Of course, the actual data repositories 150 used by the entity resolution application 120 and the alert analysis application 122 may be tailored to suit the needs of a particular case, and may include any combination of the above data sources listed above, as well as other data sources. Further, information from data repositories 150 may be provided in a "push" manner where identity records are actively sent to the entity resolution application 120 and the alert analysis application 122 as well as in a "pull" manner where the entity resolution application 120 and the alert analysis application 122 actively retrieve and/or search for records from data repositories 150.

In one embodiment, the entity resolution application 120 may be configured to detect relevant identities, entities, conditions, or activities which should be the subject of further analysis. For example, once an inbound identity record is resolved against a given entity, relevance detection rules 128 may be evaluated to determine whether the entity, with the new identity record, satisfies conditions specified by any one of the relevance detection rules. That is, the entity resolution application 120 may determine whether the entity, with the new identity record, indicates that a relevant event has occurred. This could be manifested as a rule that checks the content of an inbound identity record and generates alerts if a particular match is found. Alternatively, the entity resolution application 120 may determine that an entity is relevant if the number of distinct values for a particular attribute type is above a specified threshold, referred to as a distinct value threshold (DVT). For example, the DVT for the "social security number" attribute type may be set to "1." Thereafter, when an inbound identity record is resolved against a given entity, an alert may be generated if there is more than one distinct value for an entity's social security number. All of the current alerts 124 may be stored in memory 107.

In one embodiment, the entity resolution application 120 may be configured to apply attribute grouping rules 130 and best value rules 126 when an alert is generated in order to select which entity attribute values to include in a display summarizing the alert. As described above, e.g., an entity may have multiple phone numbers associated with the "phone number" attribute type, and in such a case, the best value rules 126 may be used to select one phone number to include in the alert display.

Figure 2:
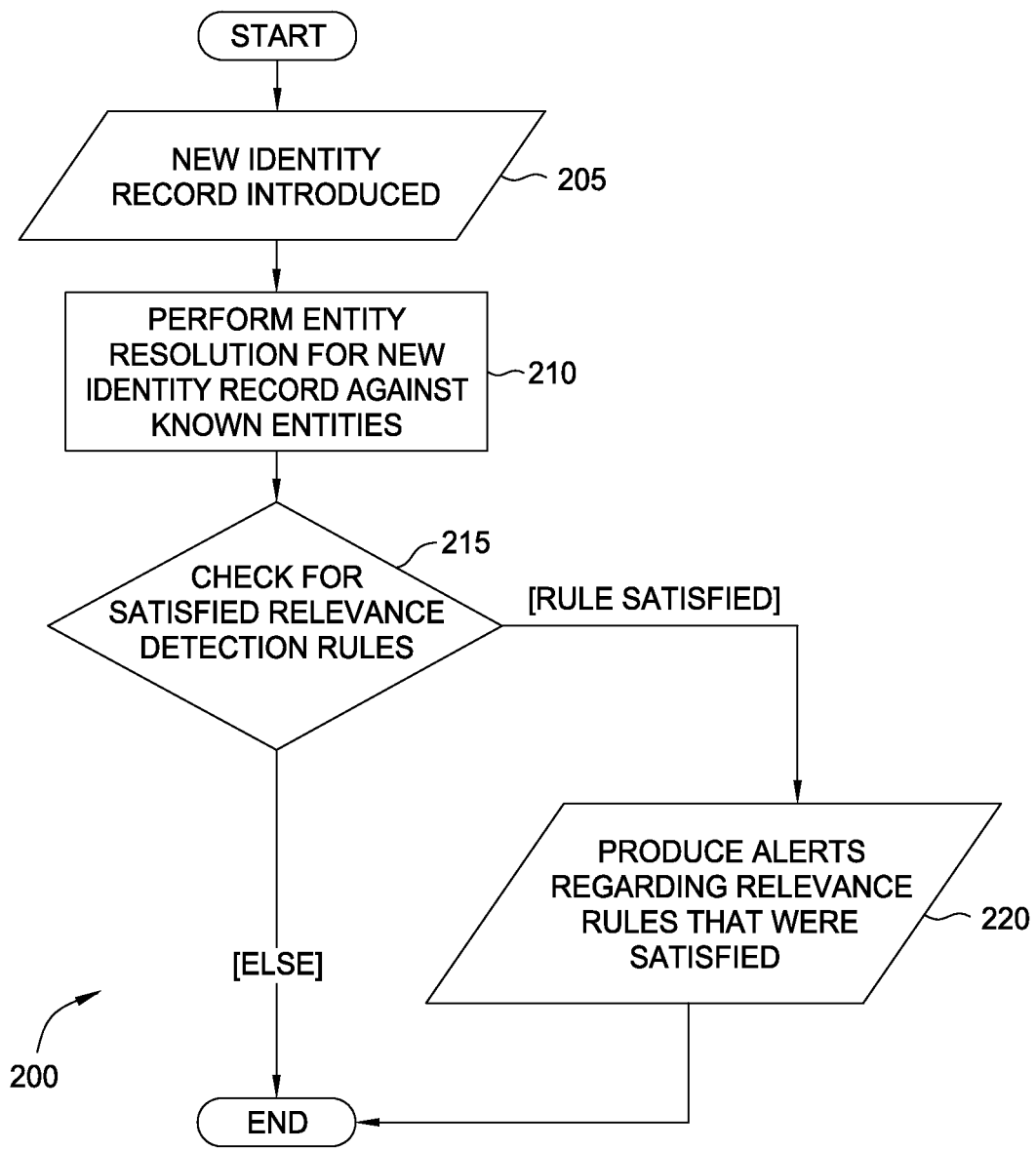
FIG. 2 is a flow diagram illustrating a method for producing alerts in an entity resolution system, according to one embodiment of the invention.

FIG. 2 is a flow diagram 200 illustrating a method for generating alerts in an entity resolution system, according to one embodiment of the invention. As shown, the method 200 begins at step 205 where the entity resolution application 120 receives a new inbound identity record. At step 210, the entity resolution application 120 resolves the new inbound record against the set of known entities 132. If the identity record does not relate to any known entity, then a new entity record may be created. Otherwise, the inbound identity record may be added to the records of one or more known entities 132. At step 215, the entity resolution application 120 may determine whether any relevance detection rules are satisfied based on the inbound identity records introduced at step 205 and processed at step 210. That is, the entity resolution application 120 may determine whether to trigger an alert event based on the new identity record. For example, when the inbound record is added to a first known entity, the entity resolution application 120 may evaluate the first known entity, as well as relationships between the first known entity and other entities, against the set of relevance detection rules 128. If any relevance detection rules 128 are satisfied, then at step 220, the entity resolution application 120 may generate an alert for each relevance detection rule 128 that has been satisfied.

Figure 3:
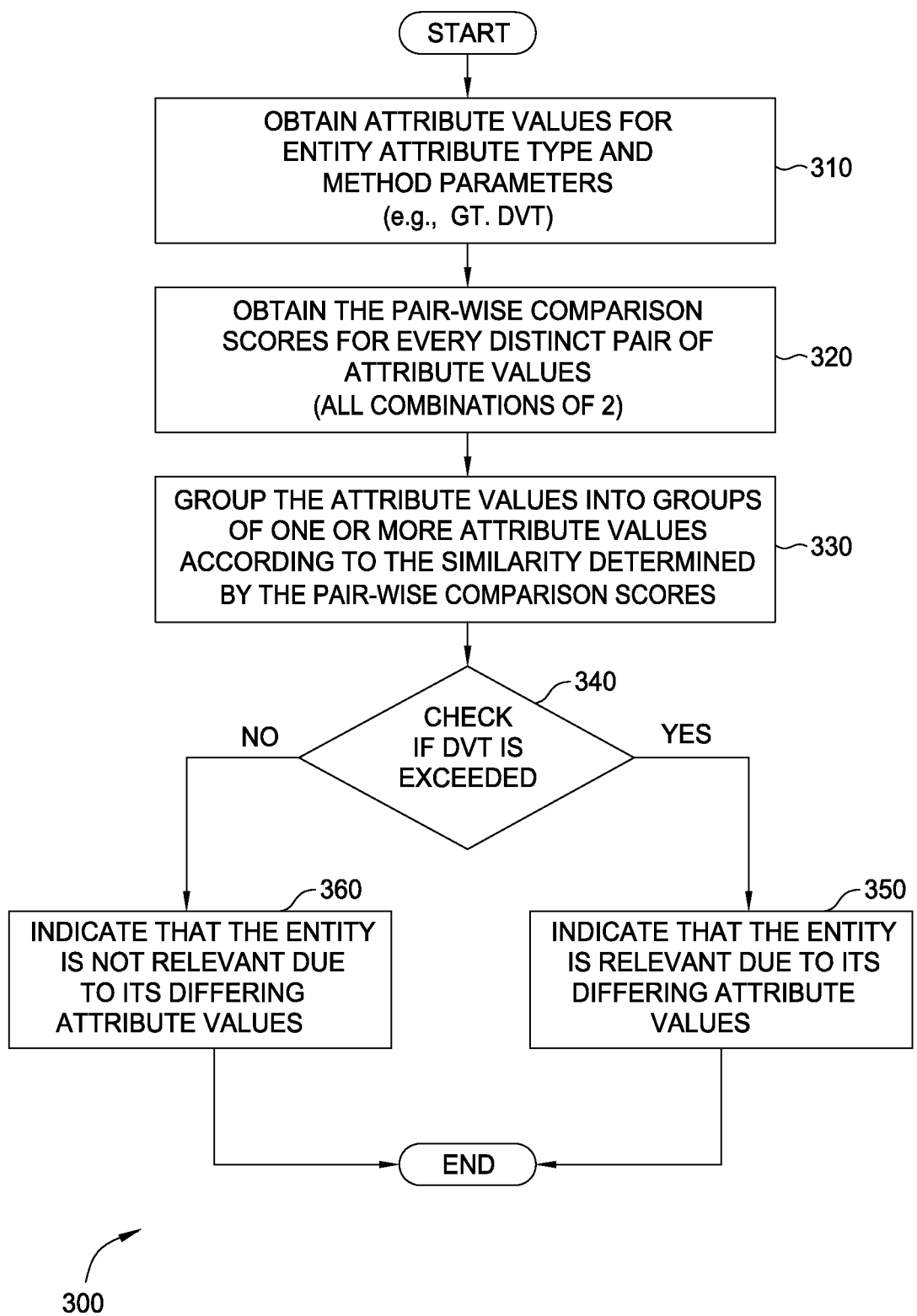
FIG. 3 is a flow diagram illustrating a method for grouping similar attribute values and determining entity relevance in an entity resolution system, according to one embodiment of the invention.

FIG. 3 is a flow diagram 300 illustrating a method for grouping similar attribute values and for determining entity relevance in an entity resolution system, according to one embodiment of the invention. As shown, the method 300 begins at step 310 where the entity resolution application 120 may obtain an attribute type, a set of attribute values and the attribute grouping rules 130 for a particular attribute of an entity. In one embodiment, the attribute grouping rules 130 include a grouping threshold (GT) and a distinct value threshold (DVT). As described above, the GT may be used to determine how to group records together, and the DVT is used to determine if an alert should be triggered. At step 320, the entity resolution application 120 may calculate a pair-wise comparison score for every distinct pair of attribute values (all combinations of two). At step 330, the attribute values may be organized into groups by applying the attribute grouping rules 130 and using the comparison scores obtained at step 320. At step 340, the entity resolution application 120 may determine if the number of distinct values (i.e., the number of groups) exceeds the DVT. This makes sense as the DVT specifies a maximum number of groups allowed for a given attribute and each group is believed to represent a distinct value for the attribute. If so, at step 350, the entity resolution application 120 may generate an alert indicating that the entity is relevant. However, if the DVT has not been exceeded, then at step 360, the entity resolution application 120 indicates that the entity is not relevant.

Optimistic and Pessimistic Grouping Strategies

In one embodiment, an "optimistic" grouping method may be used to organize attribute values into groups by maximizing the number of attribute values contained in each group and thereby minimizing the number of groups. A given attribute value may be added to a group if any member of the group has a pair-wise comparison score with the given attribute value that is within the grouping threshold. If not, then a new group may be created for the attribute value. The size of groups may be maximized and the number of groups may be minimized by merging groups when an attribute value could potentially belong to two or more groups (referred to as a "bridge attribute value"). The grouping method is optimistic because it is assumed that merging groups through a bridge attribute value will not result in groups with pairs that are very different. In extreme cases, the bridge attribute values may cause a "snowball effect," resulting in a very large group that absorbs many attribute values. Below is an example of a group with attribute values (first names) that would typically not be grouped together.

Jonathan
John
Johnny
Jon

Ton
Tony
Anthony

However, the misspelling of "Tony" as "Ton" may cause the "Ton"/"Jon" pair to bridge the first four names and the last three names into one group. The resulting group includes names that should not be included in the same group, such as "Jonathan" and "Anthony." In one embodiment, two threshold parameters may be specified to trigger a fault condition when the formation of such groups occurs. First, an average internal difference threshold (AIDT) may specify a threshold value for the average of all quantitative pair-wise comparison scores for pairs of attribute values in the group. Second, a pair-wise internal difference threshold (PIDT) may specify a greatest difference any pair of attribute values within a group may have between the two attribute values in the pair. If groups are formed where either of these thresholds are exceeded then some action can be taken as a result (e.g., triggering an alert that the entity is relevant or indicating that a primary value could not be determined via this method).

Figure 4:
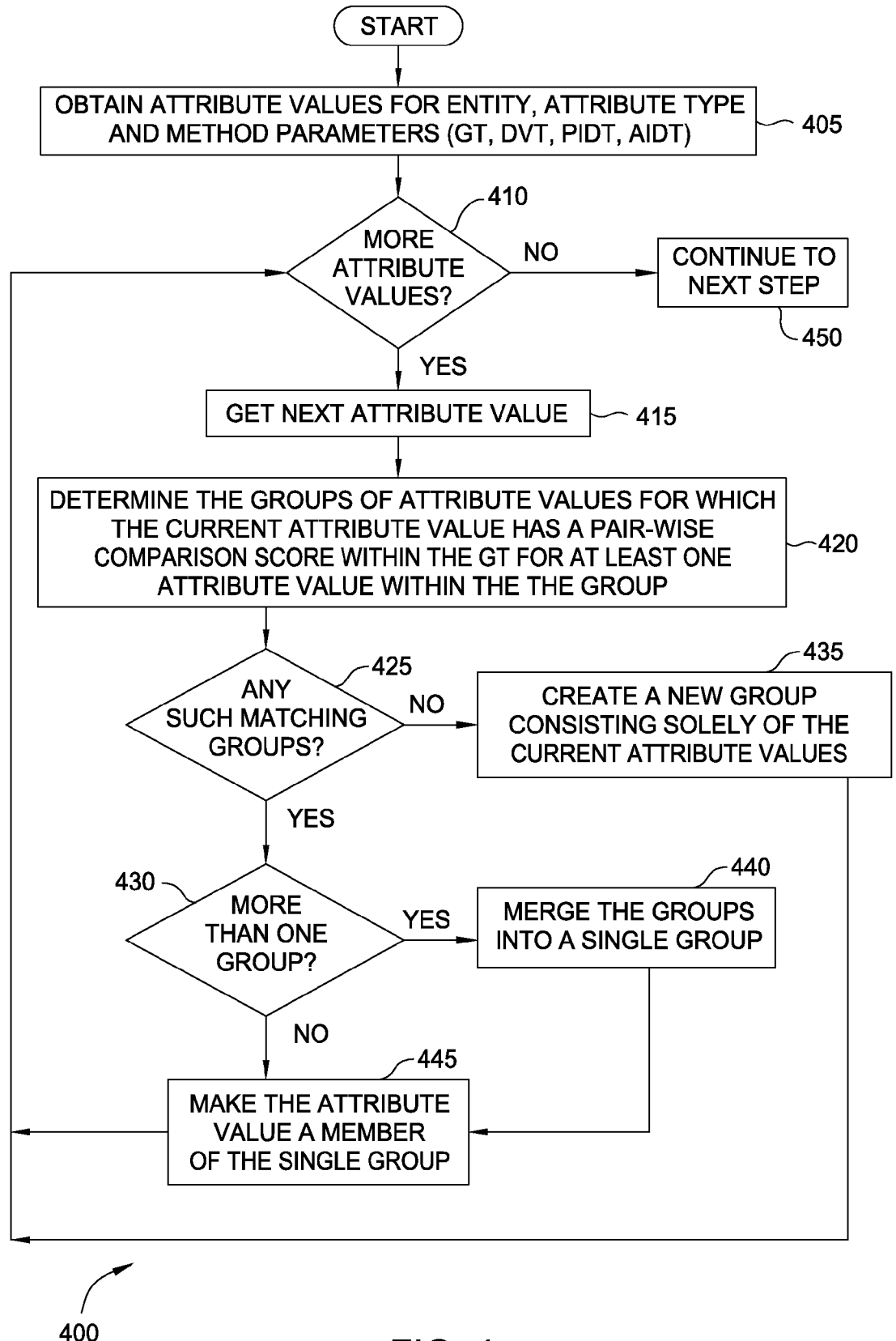
FIG. 4 is a flow diagram illustrating a method for optimistic threshold grouping in an entity resolution system, according to one embodiment of the invention.

FIG. 4 is a flow diagram 400 illustrating a method for grouping attribute values into separate groups using an optimistic grouping strategy, according to one embodiment of the invention. The method 400 iterates over individual attribute values to apply the optimistic grouping strategy. As shown, the method begins at step 405, where the entity resolution application 120 may obtain an attribute type, a set of values for the attribute and the attribute grouping rules 130 relevant to the particular attribute type. For example, all of the first name values associated with a given entity may be obtained; along with the grouping rules 130 used to assign each name to a group. In one embodiment, the attribute grouping rules 130 may include a grouping threshold (GT), a distinct value threshold (DVT), an average internal difference threshold (AIDT) and a pair-wise internal difference threshold (PIDT). At step 410, the entity resolution application 120 may determine if there is another attribute value that needs to be assigned to a group. However, if there is another attribute value, then at step 415, the next attribute value may be obtained.

At step 420, the entity resolution application 120 may determine which groups (if any) that the current attribute value has a pair-wise comparison score within the grouping threshold for at least one attribute value within a given group. At step 425, the entity resolution application 120 may determine whether any groups include a value for the attribute satisfying the criteria of step 420. If not, then at step 435 a new group may be created for the current attribute value. The method then returns to step 410. However, if at least one group meets the criteria, then at step 430 the entity resolution application 120 may determine whether more than one group includes a value for the attribute satisfying the criteria of step 420. If so, then the groups are merged into a single group at step 440, the attribute value is placed in the merged group at step 445, and the method returns to step 410. If only one group meets the criteria at step 430, then the attribute value is added to the group at step 445 and the method returns to step 410.

Figure 5:
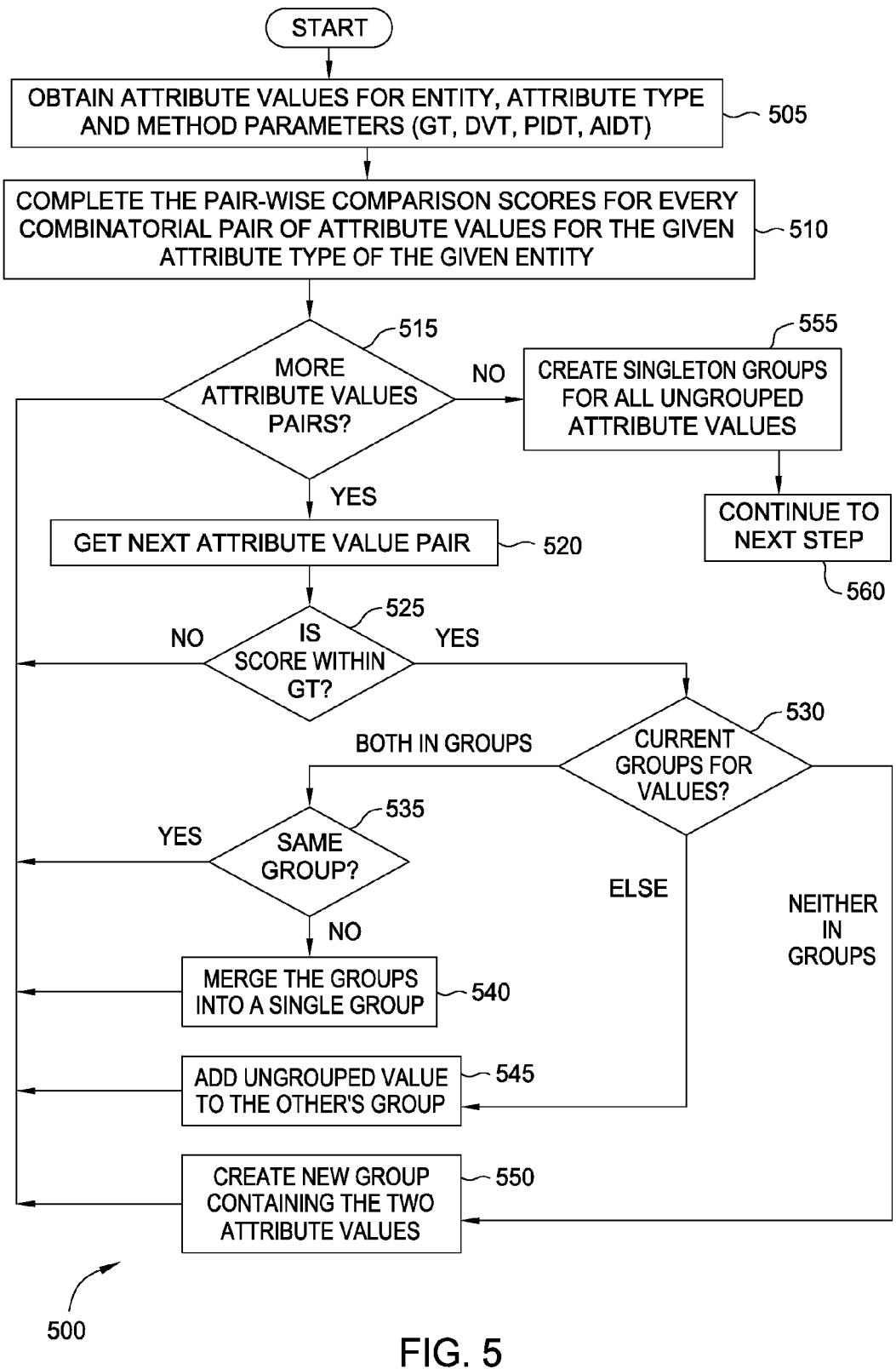
FIG. 5 is a flow diagram illustrating another method for optimistic threshold grouping in an entity resolution system, according to one embodiment of the invention.

FIG. 5 is a flow diagram illustrating a method 500 for grouping attribute values using an optimistic grouping strategy, according to one embodiment of the invention. Instead of considering single values, as in method 400, method 500 iterates over pairs of attribute values. As shown, the method begins at step 505, where the entity resolution application 120 may obtain an attribute type, a set of values for the attribute, and the relevant attribute grouping rules 130 for the attribute types. At step 510, the entity resolution application 120 may compute a pair-wise comparison score for each distinct pair of attribute values for the attribute type. A loop then occurs that includes steps 515-550 where one of the attribute pairs is evaluated at each pass through the loop until there are no more pairs left. At step 515, the entity resolution application 120 may determine if there is another attribute value pair. If not, then at step 555, the entity resolution application 120 may create singleton groups (i.e., groups with a single attribute value) for any attribute values not assigned to a group as part of steps 515-550.

If more attribute value pairs remain, at step 520 one of the attribute value pairs is selected and a comparison score may be determined for the selected pair. In one embodiment, the comparison score may provide a measure of similarity between the two attribute values in the selected attribute value pair. At step 525, the entity resolution application 120 may determine if the comparison score for the pair is within the grouping threshold, meaning the two values in the attribute value pair should be grouped together. If not, then the method returns to step 515 and values in the attribute value pair are not grouped together. Otherwise, if the score is within the grouping threshold, then at step 530, the entity resolution application 120 may determine whether either attribute value (in the pair) is a member of a group. If both attributes are current members of a group, then at step 535 the entity resolution application 120 may determine if both values are members of the same group. If so, the method returns to step 515. However, if the attribute values are members of different groups, the two groups are merged into one (step 540). After the groups are merged, the method returns to step 515. Otherwise, if the entity resolution application 120 determines that one of the attribute values is currently a member of a group (step 530), then the attribute value which is not assigned to a group is assigned to the same group as the other attribute value (step 545). The method then returns to step 515. Finally, if, at step 530, the entity resolution application 120 determines that neither attribute value is a member of a group, then at step 550 a new group is created containing the two attribute values. The method then returns to step 515.

In one embodiment, a "pessimistic" grouping method may be used to organize attribute values into groups. The "pessimistic" approach may minimize the number of attribute values contained in each group, thereby maximizing the number of groups. This approach may avoid the problem of creating groups with values that are very different from each other. In particular, pessimistic grouping avoids "bridge attribute values," which can result in merged groups having attribute value pairs with comparison scores that are not within the grouping threshold.

In the pessimistic grouping method, a given attribute value is associated with a group when each member of the group has a pair-wise comparison score with the attribute value that is within the grouping threshold. If not, then a new group may be created for that attribute value. If a given attribute value could be a member of more than one group, then that attribute value may be added to the group with an attribute value that most closely matches the given one. If more than one group meets the criteria then one of the groups may be arbitrarily chosen or a tie-breaker may be employed. The grouping method referred to a "pessimistic" because this approach assumes that merging groups through a bridge attribute value (as in the optimistic method) results in groups with pairs that have very different values.

Figure 6:
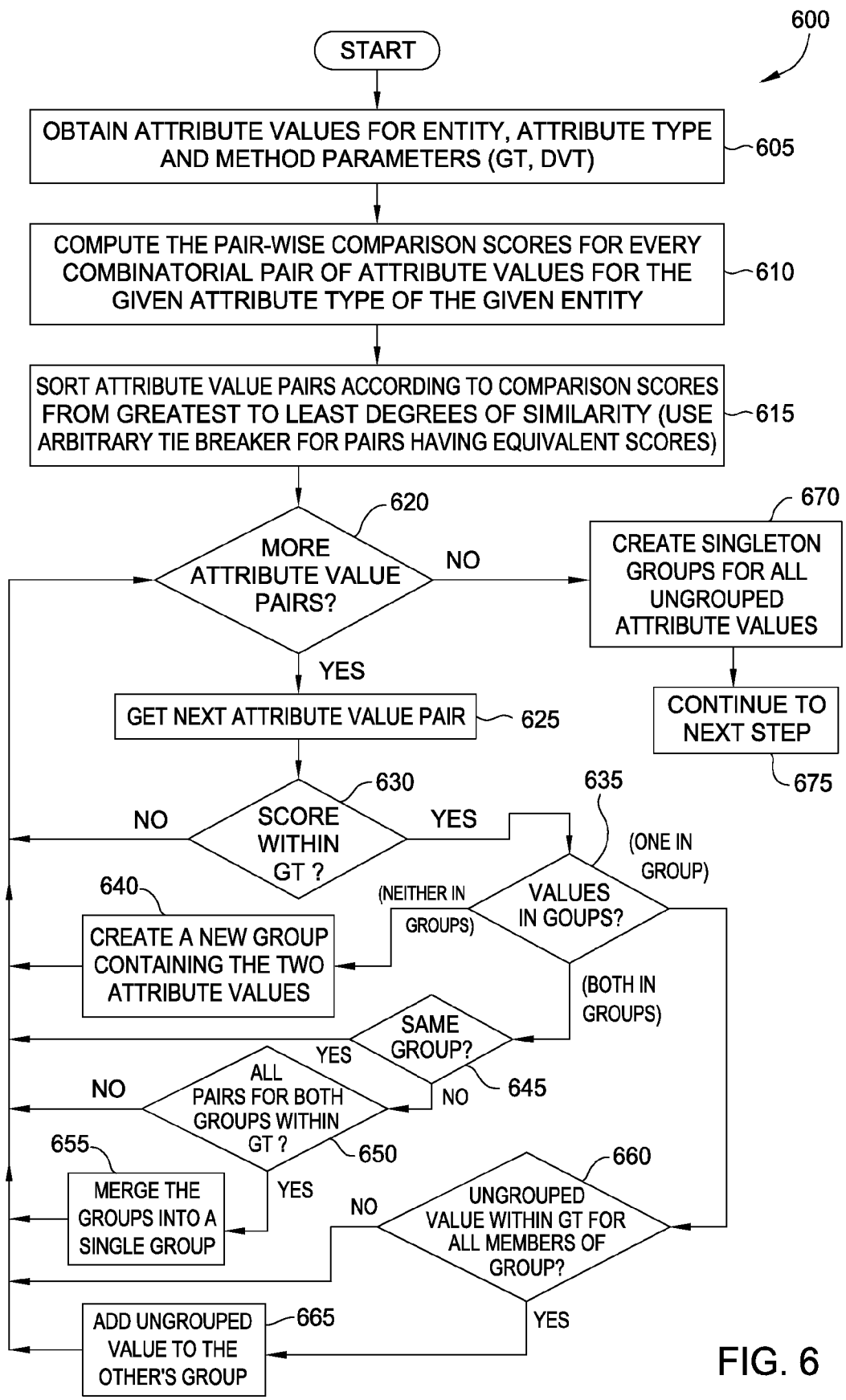
FIG. 6 is a flow diagram illustrating a method for pessimistic threshold grouping in an entity resolution system, according to one embodiment of the invention.

FIG. 6 is a flow diagram 600 illustrating a method for grouping attribute values into separate groups using a "pessimistic" grouping strategy, according to one embodiment of the invention. As shown, the method 600 begins at step 605, where the entity resolution application 120 may obtain an attribute type, a set of attribute values and any relevant attribute grouping rules 130. As described above, the attribute grouping rules 130 may include a grouping threshold (GT) and a distinct value threshold (DVT). At step 610, the entity resolution application 120 may compute pair-wise comparison scores for each pair of attribute values for the attribute type. At step 615, attribute value pairs may be sorted according to the comparison scores from greatest to least degrees of similarity (or vice-versa). For any pairs that have equivalent scores, arbitrary tie breakers may be used. Steps 620 through 665 comprise a loop where we iterate over the attribute value pairs in order from the most similar to the least similar according to the comparison score associated with each attribute value pair. At step 620, the entity resolution application 120 may determine if there is another attribute value pair to be evaluated. If not, then at step 670, the entity resolution application 120 may create singleton groups for any attribute values not assigned to any groups using the pessimistic grouping process. At step 675, the grouping process is complete.

At step 625, a next attribute value pair may be selected and a comparison score for the selected attribute value pair is obtained. At step 630, the entity resolution application 120 may determine if the comparison score between the attributes in the attribute pair is within the grouping threshold, meaning that the two values in the attribute value pair should be grouped together. If not, then the method 600 returns to step 620. Otherwise, at step 635 the entity resolution application 120 may determine if either attribute is already a member of a group. If not, then at step 640 a new group is created containing the two attribute values. The method 600 then returns to step 620. However, if both attributes are members of a group, then at step 645 the entity resolution application 120 may determine whether they are each a member of the same group. If so, the method returns to step 620. If the attribute values are members of different groups, then at step 650 the entity resolution application 120 may determine if the comparison scores for each possible attribute value pair composed using the values from both groups are within the grouping threshold. If so, then the two groups are merged into a single group (step 655) and the method returns to step 620. Otherwise, the groups are not merged and the method returns to step 620. Note that the pessimistic grouping method applies a stricter standard for merging groups than the optimistic method since the optimistic method may merge two groups without requiring that all attribute value pairs from both groups fall within the grouping threshold. If the entity resolution application 120 determines at step 635 that only one of attribute values from the pair is a member of a group, but the other is not, then the ungrouped attribute value is checked to see if it is within the grouping threshold for all members of that group at step 660. If the ungrouped value is not within the grouping threshold for each and every member of the other value's group then the method 600 returns to step 620. If, however, the ungrouped value is within the grouping threshold for each and every member of the other value's group at step 660 then the ungrouped value is added to that group at step 665 before the method 600 returns to step 630.

Figure 7:
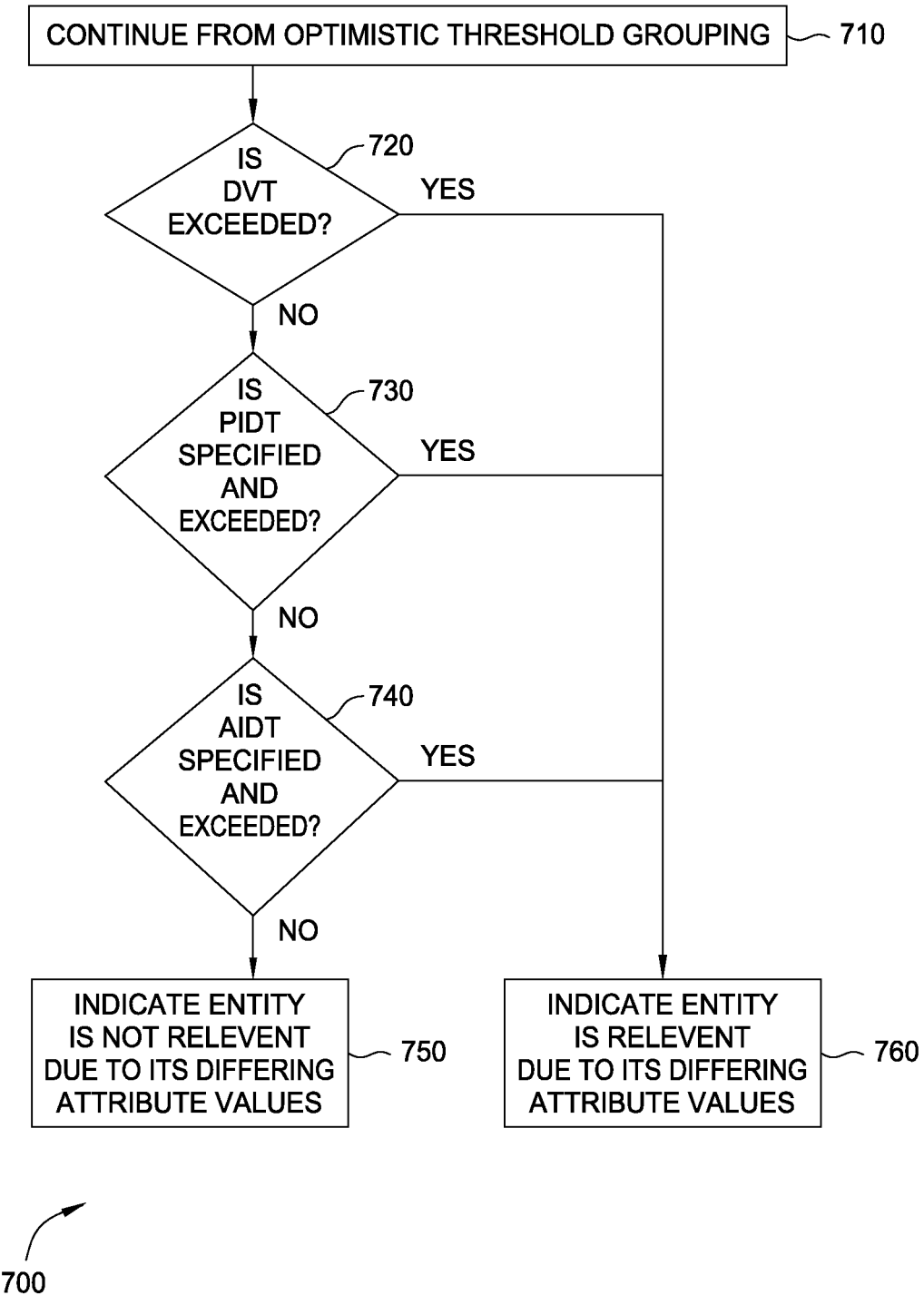
FIG. 7 is a flow diagram illustrating a method for determining entity relevance in an entity resolution system, according to one embodiment of the invention.

FIG. 7 is a flow diagram illustrating a method 700 for determining entity relevance in an entity resolution system, according to one embodiment of the invention. More specifically, FIG. 7 illustrates a method for determining whether to generate an alert for a given entity when new records are resolved to that entity; particularly, when an entity has enough distinct groups (or distinct attribute values) generated using an optimistic grouping strategy so as to warrant investigation by an analyst.

As shown, the method begins at step 710, where the entity resolution application 120 may evaluate the groups of attribute values generated using the optimistic threshold grouping methods of FIG. 4 or FIG. 5. At step 720, the entity resolution application 120 may determine if the distinct value threshold (DVT) has been exceeded. In other words, the entity resolution application 120 may determine if the total number of attribute value groups exceeds the DVT. If the number of groups exceeds the DVT, then the entity resolution application 120 may indicate that the entity is relevant (step 760). For example, an alert may be generated. After step 760, the method terminates. However, if the number of groups does not exceed the DVT, then at step 730 the entity resolution application 120 may determine whether the pair-wise internal difference threshold (PIDT) (if specified) has been exceeded. If so, then the method proceeds to step 760, described above. However, if the PIDT is not exceeded (or not specified), then at step 740 the entity resolution application 120 may determine if an average internal difference threshold (AIDT) (if specified) has been exceeded. If so, then the method proceeds to step 760, described above. However, if the AIDT not specified (or not exceeded), then the entity resolution application 120 may indicate that the entity is not relevant according to this method (step 750). After step 750, the method terminates.

Figure 8:
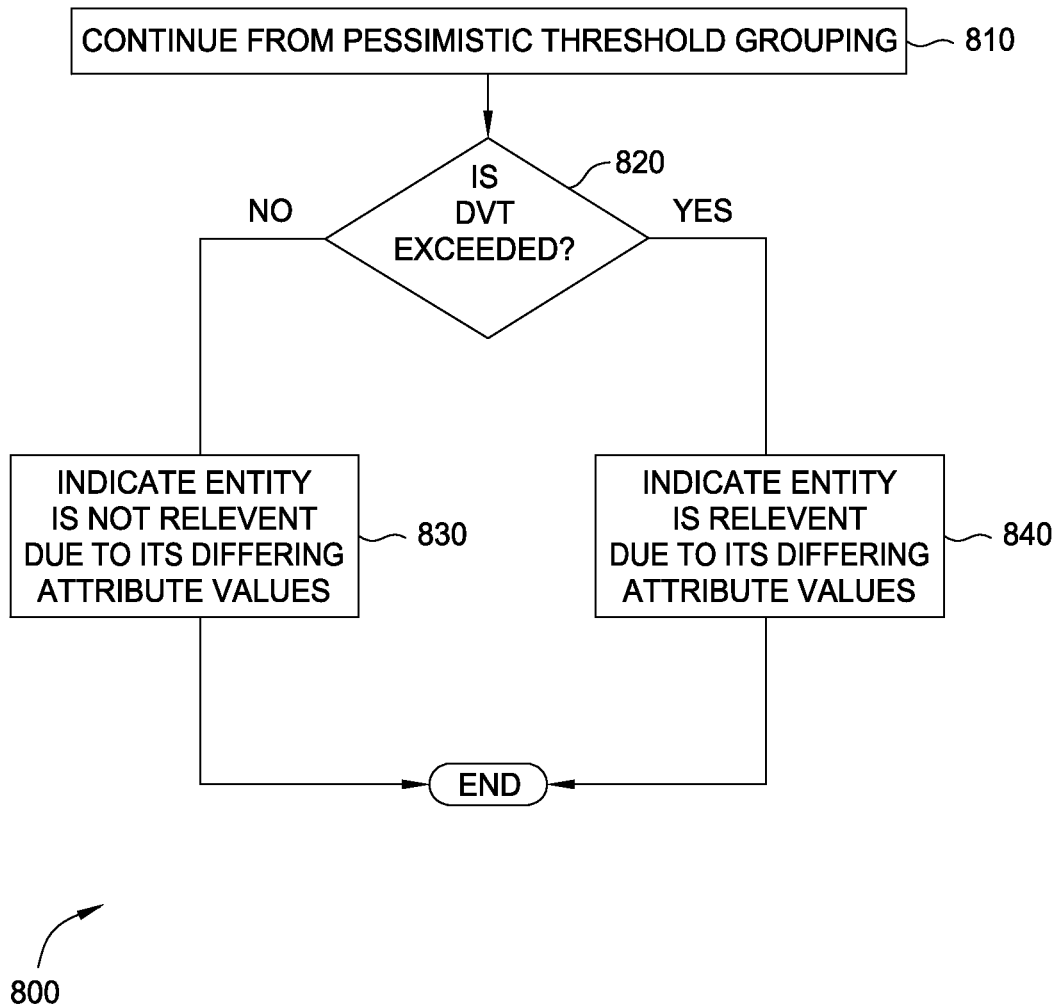
FIG. 8 is a flow diagram illustrating another method for determining entity relevance in an entity resolution system, according to one embodiment of the invention.

FIG. 8 is a flow diagram illustrating a method 800 for determining entity relevance in an entity resolution system, according to one embodiment of the invention. More specifically, FIG. 8 illustrates a method for determining whether to generate an alert for a given entity when new records are resolved to that entity; particularly, when an entity has enough distinct groups (or distinct attribute values) generated using a pessimistic grouping strategy so as to warrant investigation by an analyst.

As shown, the method 800 begins at step 810, where the entity resolution application 120 may evaluate the groups of attribute values generated using the pessimistic threshold grouping method of FIG. 6. At step 820, the entity resolution application 120 may determine whether a distinct value threshold (DVT) has been exceeded. In other words, the entity resolution application 120 may determine if the total number of attribute value groups exceeds the DVT. If so, then the entity resolution application 120 may indicate that the entity is relevant (step 840). For example, an alert may be generated. Otherwise, the entity resolution application 120 may indicate that the entity is not relevant according to this method at step (step 830).

FIG. 9 illustrates an example of graphical user interface components 900 used to configure a grouping strategy using an optimistic grouping approach, according to one embodiment of the invention. Illustratively, a display 910 is being used to specify a grouping rule for a "full name" attribute, as shown in an attribute type selection field 940. In this example, the comparison method may be set as a matter of default based on the attribute type. That is, in some cases, the method for determining a measure of similarity between any given pair of attribute values may be inferred from the attribute type specified using the attribute type selection field 940. FIG. 10, discussed below, illustrates an alternative where the user may expressly select a comparison method. Further, the display 910 allows a user to enter a name for a new rule using the "Rule Name" field 920. As shown, a user has entered a rule name of "Entity has too many aliases." The "Processing Rank" field 930 allows a user to specify the priority of this rule relative to other rules applied to the "full name" attribute type. The "Detection Method" field 950 allows the user to specify a grouping method. A user specifies the DVT using the "Distinct Value Threshold" field 960. The "Grouping Score Threshold" field 970 allows the user to specify a minimum comparison score between two attribute values in order for the values to be grouped together. The "Minimum Average Score" field 975 allows the user to specify the AIDT parameter. The "Minimum Pair-Wise Score" field 980 may allow the user to specify the PIDT parameter. A field 985 allows a user to specify whether other rules should be skipped if the current rule is satisfied for the attribute type. For example, if a value for "Full Name" causes the rule to generate an alert, then other rules that apply to the "Full Name" attribute type may be skipped.

FIG. 10 illustrates another example of graphical user interface components 1000 used to configure a grouping strategy using an optimistic grouping approach, according to one embodiment of the invention. Unlike the display 910, display 1010 allows a user to select a pair-wise comparison method for the attributes using a "Comparison Method" field 1060. Like display 910, display 1010 includes a "Rule Name" field 1020, a "Processing Rank" field 1030, an "Attribute Type" field 1040, a "Detection Method" field 1050, a "Distinct Value Threshold" field 1070, a "Grouping Score Threshold" field 1075, a "Minimum Pair-Wise Score" field 1080, and a rule-skipping field 1085.

FIG. 11 illustrates another example of graphical user interface components 1100 used to configure a grouping strategy using a pessimistic grouping approach, according to one embodiment of the invention. Like display 910, a display 1110 contains a "Rule Name" field 1120, a "Processing Rank" field 1130, an "Attribute Type" field 1140, a "Detection Method" field 1150, a "Distinct Value Threshold" field 1160, a "Grouping Score Threshold" field 1170, and a rule-skipping field 1180.

Best Value Determination for Entity Attribute Groups

Figure 12:
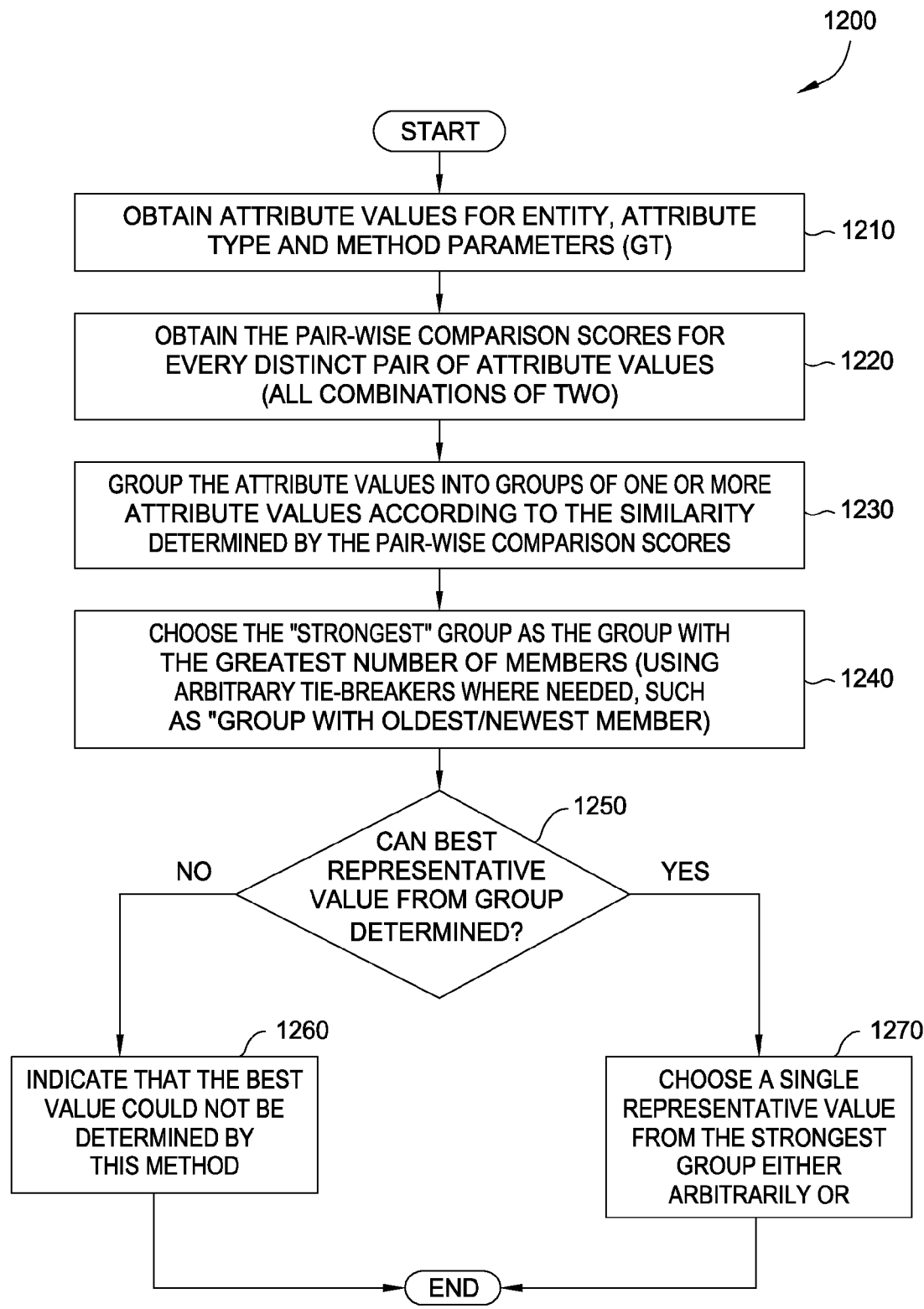
FIG. 12 is a flow diagram illustrating a method for grouping similar attribute values to determine a best value for an attribute in an entity resolution system, according to one embodiment of the invention.

FIG. 12 is a flow diagram illustrating a method 1200 for grouping similar attribute values associated with an attribute type in an entity resolution system, according to one embodiment of the invention. As shown, the method 1200 begins at step 1210 where the entity resolution application 120 may obtain an attribute type along with a set of attribute values and grouping rules 130 associated with the attribute type. As described above, the attribute grouping rules 130 may include a grouping threshold (GT) and a distinct value threshold (DVT). At step 1220, the entity resolution application 120 may calculate a pair-wise comparison score for every distinct pair of attribute values. At step 1230, the attribute values may be organized into groups according to the comparison scores obtained at step 1220. For example, FIGS. 4 and 5 provide an example of a method for grouping attribute values using an "optimistic" approach, and FIG. 6 provides an example of a method for grouping attribute values using a "pessimistic" approach.

At step 1240, the entity resolution application 120 may select a preferred group from the groups created at step 1230. In one embodiment, the preferred group may be the group with the greatest number of members. As each group is created by grouping similar values for the attribute, the group with the greatest number of members may most represent the entity. If two (or more) groups have the same number of members, arbitrary tie breakers may be used, such as selecting a group with the oldest or newest members. At step 1250, the entity resolution application 120 may determine whether a best representative value can be determined. In one embodiment, a "degree of confidence" may be associated with each best value determination rule. If the degree of confidence for the best value picked by a given rule is above a specified threshold value, then the best value may assigned by that rule. If two or more rules both assign a best value for a preferred group, the one assigned a higher degree of confidence may be selected. This approach allows multiple rules to be applied to the same group of entity attributes. At step 1270, if the best value can be determined, then the best value is selected from the preferred group. Otherwise, then at step 1260, the entity resolution application 120 may indicate that the best value cannot be determined. For example, this may occur if multiple groups tie as the preferred group or if the confidence scores are below a specified threshold value. Of course, arbitrary tie breakers or other methods may be used to select a best value from a preferred group. After step 1260, the method terminates.

Figure 13:
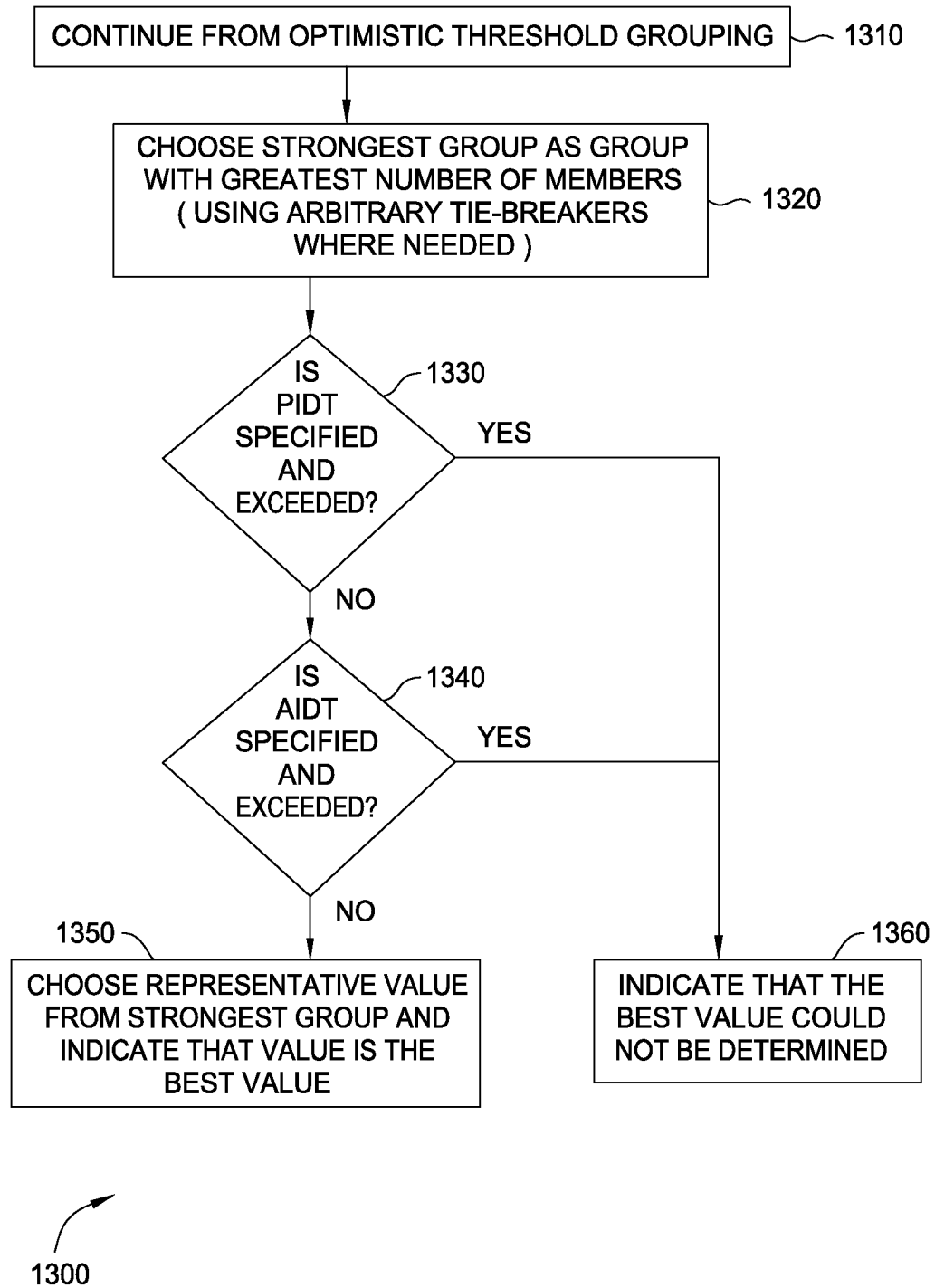
FIG. 13 is a flow diagram illustrating a method for determining a best value of an attribute type in an entity resolution system, according to one embodiment of the invention.

FIG. 13 is a flow diagram 1300 illustrating a method for determining a best value of an entity attribute where attribute values are grouped using an optimistic grouping strategy, according to one embodiment of the invention. As shown, the method begins at step 1310, where the entity resolution application 120 may evaluate attribute value groups obtained after applying optimistic threshold grouping methods of FIG. 4 or FIG. 5. At step 1320, the entity resolution application 120 selects a preferred group (e.g., the group with the greatest number of members). At step 1330, the entity resolution application 120 may determine if a pair-wise internal difference threshold is exceeded. If so, then the method proceeds to step 1360, where the entity resolution application 120 may indicate that the best value could not be determined. The method 1300 then terminates. However, if the PIDT is not exceeded (or simply not specified), then at step 1340 the entity resolution application 120 may determine if the average internal difference threshold AIDT is exceeded. If so, then the method proceeds to step 1360, described above. However, if the AIDT is not exceeded (or simply not specified), then at step 1350 the entity resolution application 120 may select a best value from the preferred group. After step 1350, the method terminates.

Figure 14:
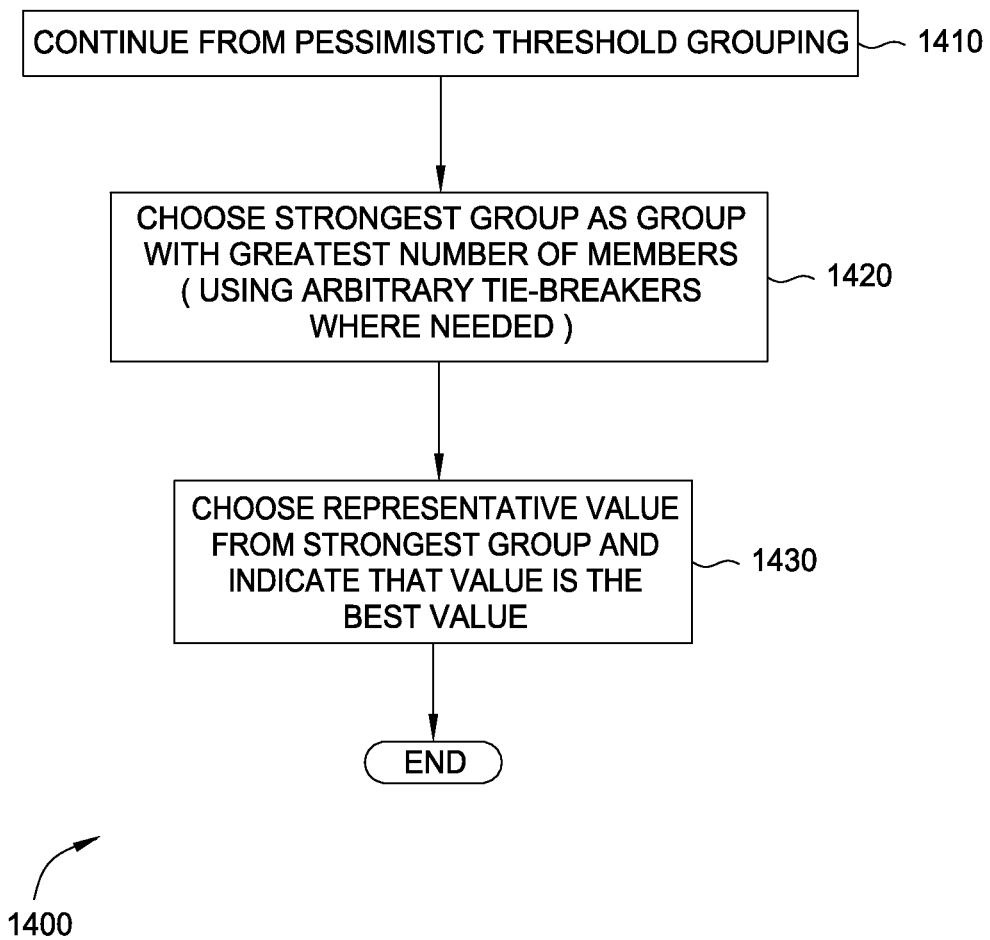
FIG. 14 is a flow diagram illustrating another method for determining a best value of an attribute type in an entity resolution system, according to one embodiment of the invention.

FIG. 14 is a flow diagram 1400 illustrating a method for determining a "best" value of an entity attribute where attribute values are grouped using a pessimistic grouping strategy, according to one embodiment of the invention. As shown, the method 1400 begins at step 1410, where the entity resolution application 120 may evaluate attribute value groups obtained by applying the pessimistic threshold grouping method of FIG. 6. At step 1420, the entity resolution application 120 may select the preferred group as the group with the greatest number of members, using arbitrary tie breakers where needed. At step 1430, the entity resolution application 120 may select a "best" value from the preferred group. After step 1430, the method terminates.

FIG. 15 illustrates an example of graphical user interface components 1500 used to configure a best value determination rule in an entity resolution system, according to one embodiment of the invention. The "Detection Method" field 1540 allows the user to specify a grouping method. Illustratively, a display 1510 includes a "Rule Name" field 1520, a "Processing Rank" field 1530, an "Attribute Type" field 1540, a "Detection Method" field 1550, a "Grouping Score Threshold" field 1555 a "Minimum Average Score" field 1560, and a "Minimum Pair-Wise Score" field 1565. The display 1510 also includes a "Base Confidence Level" field 1570, which allows a user to assign a level of confidence to the rule. In this example, the more the user believes the rule will select a "best" representative value from a group of attribute values, the higher the confidence level. Additional criteria may limit the type of entities to which the best value rule may be applied. Illustratively, an "Attribute Type" field 1575 is set to "Gender", and a "Matching Value" field 1580 is set to "Female." Thus, the example best value determination rule shown in display 1510 is only applied to individuals who are female.

FIG. 16 illustrates another example of graphical user interface components 1600 used to configure a best value determination rule in an entity resolution system, according to one embodiment of the invention. Unlike the display 1510 of FIG. 15, a user may select a pair-wise comparison method using a "Comparison Method" field 1655. In one embodiment, a user may select from different comparison methods that provide a measure of similarity for pair-wise combinations of attribute values. In such cases, field 1655 allows a user to select a comparison method. Like display 1510, display 1610 includes a "Rule Name" field 1620, a "Processing Rank" field 1630, an "Attribute Type" field 1640, a "Detection Method" field 1650, a "Grouping Score Threshold" field 1660, a "Minimum Pair-Wise Score" field 1665, and a "Base Confidence Level" field 1670. Additional criteria may limit the type of entities to which the best value may be applied. Illustratively, an "Attribute Type" field 1680 is set to "Gender", and a "Matching Value" field 1685 is set to "Male". This example embodiment does not use (or allow the user to specify) the AIDT via the "Minimum Average Score" field.

FIG. 17 illustrates another example of graphical user interface components 1700 used to configure a best value determination rule in an entity resolution system, according to one embodiment of the invention. Illustratively, a display 1710 includes a "Detection Method" field 1750 being used to specify a pessimistic grouping method. As in FIG. 17, the display 1710 contains a "Rule Name" field 1720, a "Processing Rank" field 1730, an "Attribute Type" field 1740, a "Detection Method" field 1750, a "Grouping Score Threshold" field 1755, a "Base Confidence Level" field 1760, an "Attribute Type" field 1765 and a "Matching Value" field 1770.

Advantageously, embodiments of the present invention provide a method for grouping similar values of an attribute type and determining the best value of an attribute type for an entity in an entity resolution system. By applying attribute grouping rules to organize similar attribute values into groups, an accurate number of "distinct" values for the entity may be ascertained by counting the number of resulting groups. If the number of distinct values is above a specified threshold, then the entity may be deemed relevant. For example, an alert may be generated if more than two social security numbers are present. Furthermore, a preferred group may be selected from the resulting groups and a "best value" may be selected from the preferred group by applying best value rules. The best value is generally the value selected by the entity resolution system as being most representative of the entity. For example, the "best" name, address, phone number, etc. to use in presenting a summary of information about that entity may be selected. Thus, if an entity includes records with first names of "Bill," William," and "Billy," the best value rules may be used to select one of these names to use in graphical displays and alerts, reports, etc., related to this entity.

While the foregoing is directed to embodiments of the present invention, other and further embodiments of the invention may be devised without departing from the basic scope thereof, and the scope thereof is determined by the claims that follow.

What is claimed is:

1. A computer-implemented method of selecting a representative value for a specified attribute type in an entity resolution system storing identity records related to a plurality of entities, the method comprising:

receiving a selection of an entity in the entity resolution system, wherein the selected entity is associated with a plurality of identity records stored by the entity resolution system, wherein each identity record includes one or more attribute types and corresponding attribute values, and wherein the plurality of identity records have an assumed relation to a distinct individual;

generating one or more distinct value groups, wherein each distinct value group includes one or more attribute values corresponding to the specified attribute type, wherein generating the one or more distinct value groups comprises:

identifying a set of attribute values corresponding to the specified attribute type;

calculating a pair-wise comparison score for each distinct attribute value pair in the set of attribute values; and assigning each distinct attribute value pair in the set of attribute values to one of the one or more distinct value groups based upon the pair-wise comparison score calculated for each distinct attribute value pair in the set of attribute values, wherein a respective distinct attribute value pair is assigned to the one of the one or more distinct value groups upon determining that its pair-wise comparison score is within a specified grouping threshold;

selecting one of the one or more distinct value groups as a preferred group; and selecting, from the preferred group, a first attribute value as the representative value for the specified attribute type of the selected entity by selecting an attribute value with a least average pair-wise difference with other attribute values of the preferred group, wherein selecting the attribute value with the least average pair-wise difference comprises analyzing the pair-wise comparison score calculated for each distinct attribute value pair in the preferred group.

2. The method of claim 1, wherein each pairwise comparison score specifies a measure of similarity between the respective distinct attribute value pair.

3. The method of claim 1, further comprising generating an entity display summary which includes a display of the first attribute value.

4. The method of claim 1, wherein selecting one of the one or more distinct value groups as the preferred group comprises selecting the distinct value group with a greatest number of attribute values corresponding to the specified attribute type.

5. The method of claim 1, further comprising assigning a confidence level to the first attribute value.

6. A computer program product for selecting a representative value for a specified attribute type in an entity resolution system storing identity records related to a plurality of entities, the computer program product comprising a non-transitory computer usable storage medium having computer usable program code configured to:

receive a selection of an entity in the entity resolution system, wherein the selected entity is associated with a plurality of identity records stored by the entity resolution system, wherein each identity record includes one or more attribute types and corresponding attribute values, and wherein the plurality of identity records have an assumed relation to a distinct individual;

generate one or more distinct value groups, wherein each distinct value group includes one or more attribute values corresponding to the specified attribute type, wherein generating the one or more distinct value groups comprises:
identifying a set of attribute values corresponding to the specified attribute type;
calculating a pair-wise comparison score for each distinct attribute value pair in the set of attribute values; and
assigning each distinct attribute value pair in the set of attribute values to one of the one or more distinct value groups based upon the pair-wise comparison score calculated for each distinct attribute value pair in the set of attribute values, wherein a respective distinct attribute value pair is assigned to the one of the one or more distinct value groups upon determining that its pair-wise comparison score is within a specified grouping threshold;
select one of the one or more distinct value groups as a preferred group; and
select, from the preferred group, a first attribute value as the representative value for the specified attribute type of the selected entity by selecting an attribute value with a least average pair-wise difference with other attribute values of the preferred group, wherein selecting the attribute value with the least average pair-wise difference comprises analyzing the pair-wise comparison score calculated for each distinct attribute value pair in the preferred group.

7. The computer program product of claim 6, wherein each pairwise comparison score specifies a measure of similarity between the respective distinct attribute value pair.

8. The computer program product of claim 6, wherein the computer usable program code is further configured to generate an entity display summary which includes a display of the first attribute value.

9. The computer program product of claim 6, wherein the computer usable program code is further configured to select one of the one or more distinct value groups as the preferred group by selecting the distinct value group with a greatest number of attribute values corresponding to the specified attribute type.

10. The computer program product of claim 6, wherein the computer usable program code is further configured to assign a confidence level to the first attribute value.

11. A system comprising:
a processor; and
a memory containing a program, which, when executed by the processor, is configured to select a representative value for a specified attribute type in an entity resolution system storing identity records related to a plurality of entities by performing an operation comprising:
receiving a selection of an entity in the entity resolution system, wherein the selected entity is associated with a plurality of identity records stored by the entity resolution system, wherein each identity record includes one or more attribute types and corresponding attribute values, and wherein the plurality of identity records have an assumed relation to a distinct individual;
generating one or more distinct value groups, wherein each distinct value group includes one or more attribute values corresponding to the specified attribute type, wherein generating the one or more distinct value groups comprises:
identifying a set of attribute values corresponding to the specified attribute type;
calculating a pair-wise comparison score for each distinct attribute value pair in the set of attribute values; and
assigning each distinct attribute value pair in the set of attribute values to one of the one or more distinct value groups based upon the pair-wise comparison score calculated for each distinct attribute value pair in the set of attribute values, wherein a respective distinct attribute value pair is assigned to the one of the one or more distinct value groups upon determining that its pair-wise comparison score is within a specified grouping threshold;
selecting one of the one or more distinct value groups as a preferred group; and
selecting, from the preferred group, a first attribute value as the representative value for the specified attribute type of the selected entity by selecting an attribute value with a least average pair-wise difference with other attribute values of the preferred group, wherein selecting the attribute value with the least average pair-wise difference comprises analyzing the pair-wise comparison score calculated for each distinct attribute value pair in the preferred group.

12. The system of claim 11, wherein each comparison score specifies a measure of similarity between the respective distinct attribute value pair.

13. The system of claim 11, wherein the operations further comprise generating an entity display summary which includes a display of the first attribute value.

14. The system of claim 11, wherein selecting one of the one or more distinct value groups as the preferred group comprises selecting the distinct value group with a greatest number of attribute values corresponding to the specified attribute type.

* * * * *